MAGNETIC SYSTEM

Filed May 25, 1954 3 Sheets-Sheet 1

INVENTOR.
DAN C. ROSS
BY Ralph L. Thomas
ATTORNEY

*INVENTOR.*
DAN C. ROSS
*BY* Ralph L. Thomas
ATTORNEY

April 28, 1959 D. C. ROSS 2,884,621

MAGNETIC SYSTEM

Filed May 25, 1954 3 Sheets-Sheet 3

INVENTOR.
DAN C. ROSS

BY Ralph L. Thomas

ATTORNEY

United States Patent Office 2,884,621

Patented Apr. 28, 1959

2,884,621

MAGNETIC SYSTEM

Dan C. Ross, Wappingers Falls, N.Y., assignor to International Business Machines Corporation, New York, N.Y., a corporation of New York Application May 25, 1954, Serial No. 432,146

9 Claims. (Cl. 340—174)

This invention relates, in general, to magnetic systems capable of representing binary information by the residual magnetic state of bi-stable magnetic elements, and in particular, to an array of magnetic cores employed for high speed storage and interrogation of information.

An object of the present invention is to provide a system for parallel read-in and serial read-out of binary information in an array of magnetic cores.

A further object of the present invention is to provide a system for simultanteously reading and writing information in a magnetic core array.

Another object of the present invention is to provide a system for parallel read-in of binary information by coincident currents applied to magnetic cores, forming shift registers arranged in an array, and serial read-out of binary information by the shift register principle.

A still further object of the present invention is to provide a system for writing information in any one magnetic core shift register of a group of magnetic core shift registers arranged in an array and simultaneously shifting information from any one or all of the remaining magnetic core shift registers.

Still another object of the present invention is to provide a system for writing and reading wherein writing circuits using coincident current pulses are used to write information in parallel in any one magnetic core shift register in a group of magnetic core shift registers arranged in an array, and serial read-out of information is effected in any one or all of the remaining magnetic core shift registers by the application of shift pulses applied to individual magnetic core shift registers, characterized in that the coincident current write pulses may occur simultaneously with the shift pulses.

Other objects of the invention will be pointed out in the following description and claims and illustrated in the accompanying drawings, which disclose by way of example, the principle of the invention, and the best mode, which has been contemplated of applying that principle.

Figure 1:
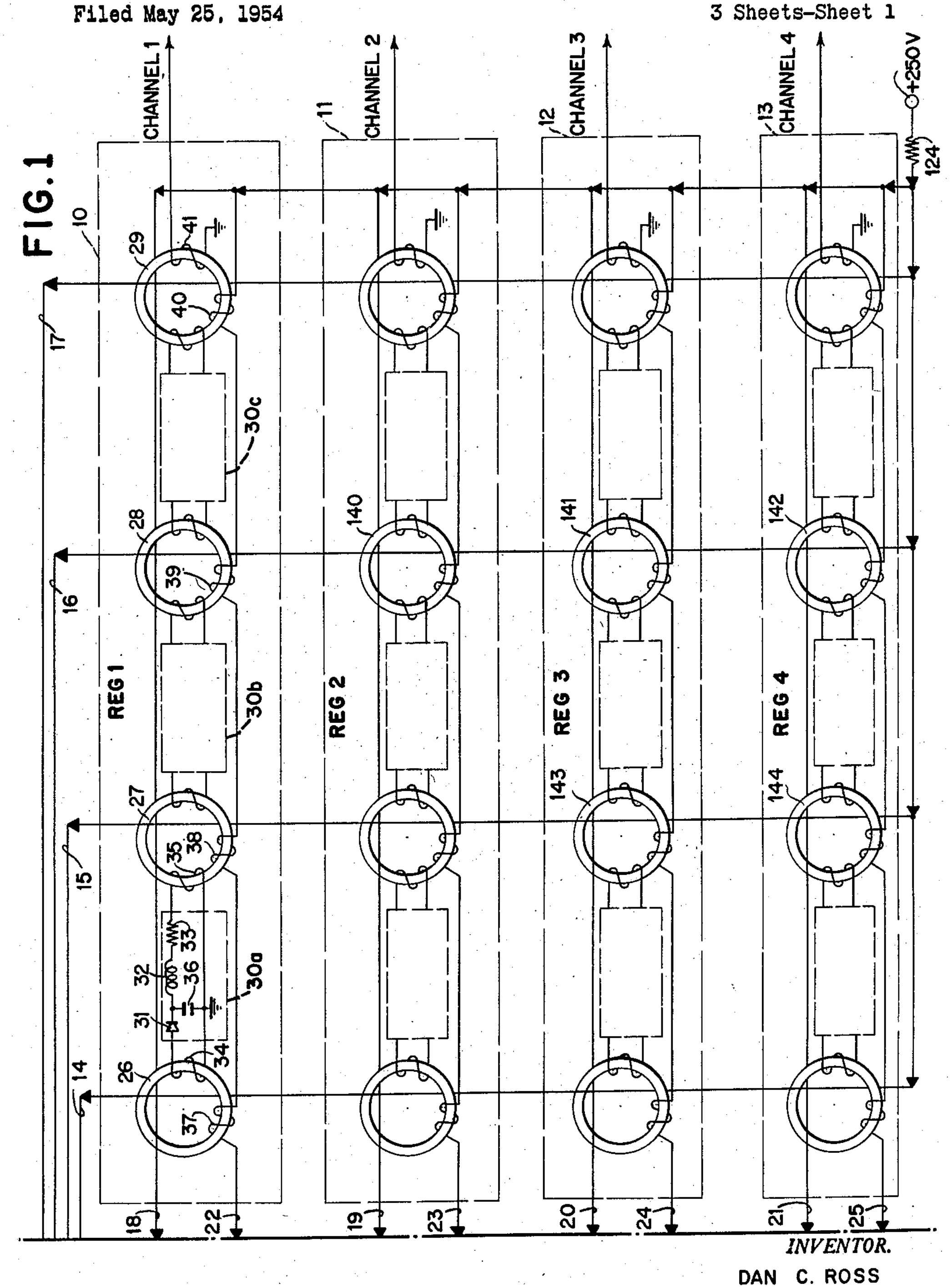
Fig. 1 is a wiring schematic of magnetic core shift registers arranged in a rectangular array.

Reference is made to Fig. 1 wherein four magnetic core shift registers are shown enclosed in dotted line blocks labeled 10 through 13. The bi-stable magnetic cores forming the magnetic core shift registers constitute collectively a magnetic core memory array. Lines 14 through 17, referred to hereinafter as X driving lines, serve to supply information in the form of pulses to the cores of the magnetic core memory array. Lines 18 through 21, hereinafter referred to as Y driving lines, serve to select the cores in which information is written. Information is written in any one of the magnetic core shift registers 10 through 13 by selectively energizing one of the lines 18 through 21 simultaneously as information in the form of pulses is applied to lines 14 through 17. The X drive lines 14 through 17 and the Y drive lines 18 through 21 provide for parallel read-in of binary information by coincident currents applied to magnetic cores forming shift registers arranged in an array, and lines 22 through 25 provide for serial readout of binary information by the shift register principle, explained subsequently.

Magnetic cores 26 through 29 of magnetic core shift register 10 are inter-coupled by transfer circuits labeled 30*a*, 30*b* and 30*c*, as shown. The transfer circuit 30*a* comprises a diode 31, coil 32 and resistor 33 connected in series between the upper terminals of windings 34 and 35 with a condenser 36 connected between ground and the junction of diode 31 and coil 32. The lower terminals of windings 34 and 35 are grounded. When a shift pulse is applied to shift winding 37 on core 26, transfer circuit 30*a* serves to transfer the information stored in magnetic core 26 to magnetic core 27. In a like manner, shift pulses applied to shift windings 38 and 39 cause information stored in cores 27 and 28 to be transferred on transfer circuits 30*b* and 30*c* to cores 28 and 29, respectively. A shift pulse applied to shift winding 40 causes information stored in core 29 to be transferred by winding 41 to channel 1.

Figure 2:
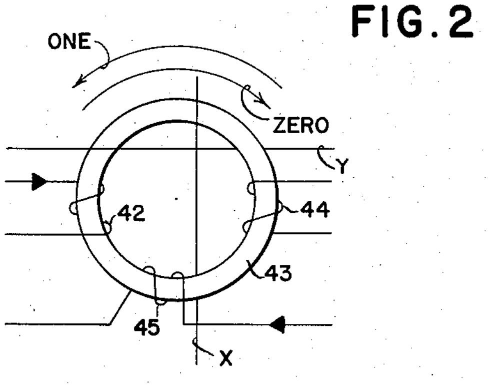
Fig. 2 illustrates a magnetic core with associated electrical windings.

Reference is made to Fig. 2 for a discussion of the operation of the magnetic cores involved. The bi-stable magnetic cores employed for the purposes of the present invention are interlinked with X and Y write windings which, when energized, cause the core to be magnetized in one or the other direction. A single X or Y line passing through a core is equivalent to a winding having one turn.

Figures 3, 5:
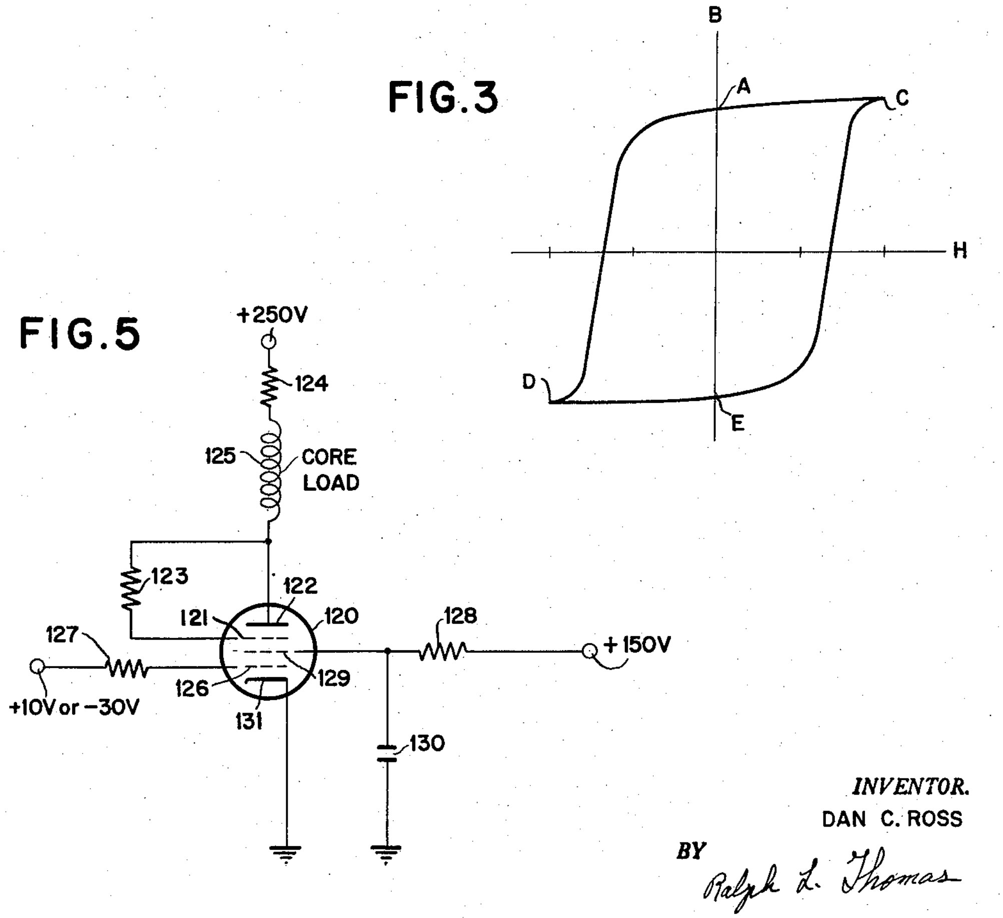
Fig. 3 is a curve illustrating a preferred hysteresis characteristic of the magnetic cores involved.
Fig. 5 is an illustration of a driver circuit employed for writing or shifting.

Figure 3 illustrates an ideal hysteresis loop for commercially obtainable magnetic material. If the state of magnetization of a core of such material is that indicated by point A, application of a positive magnetomotive force causes it to traverse the hysteresis curve to point C and upon relaxation of this positive force, revert to point A. The application of a negative magnetomotive force greater than the coercive force causes the curve to be traversed to point D and when the force is terminated, traversed to point E. Similarly, with the remanence state of the core standing at point E, application of a negative magnetomotive force causes the curve to be traversed toward point D and return to point E when the negative force is relaxed, while a positive force greater than the coercive force causes traversal of the curve from point E to point C and return to point A when the coercive force is terminated.

Points A and E in Figure 3 are stable remanence states readily adapted for representing binary information, and a magnetic core may be driven to either of these two states by energizing both its X and Y lines. The cores in the arrangement of Figure 1 are driven to one remanence state by positive coincident currents, individually less than the coercive force, applied to the X and Y windings. That is, the magnitude of either the X or the Y line current alone is insufficient to overcome the coercive force, but applied together, they exceed the coercive force. In the present illustration, however, positive currents applied to the X and Y windings, as wound, establish a positive magnetomotive force greater than the coercive force which changes cores in the zero state of remanence, represented by point E on the curve in Fig. 3, to the one state of remanence, represented by point A. The direction of flux within a core is in the counterclockwise direction for a binary one and in the clockwise direction for a binary zero as indicated by the arrows in Figure 2.

Referring again to Fig. 2, winding 42 on core 43 is an input winding. Windings 44 and 45 are output and shift windings, respectively. A pulse of current applied to input winding 42 in the direction indicated by the arrowhead establishes a positive magnetomotive force on core 43 which magnetizes the core in a counterclockwise direction represenative of the one state of remanence. The application of a pulse of current to winding 45 in the direction indicated by the arrowhead creates a negative magnetomotive force on core 43 which establishes magnetic flux in the clockwise direction representative of the zero state of remanence. A change from the one state of remanence to the zero state of remanence induces a voltage in the output winding 44 which is applied to a transfer circuit of the type shown in the dotted line block labeled 30*a* in Figure 1. If the magnetic core 43 in Figure 2 is in the zero state of remanence when a shift pulse is applied to winding 45, a negligibly small voltage is induced in output winding 44 as the state of magnetization of the core 43 is changed from point E to point D and return in Figure 3.

Reference is made to Fig. 1 for a description of the operation of the transfer circuit 30*a*. A current induced in winding 34 when the magnetic core 26 is changed from the one state of remanence to the zero state of remanence is passed by diode 31 to charge condenser 36 positively with respect to ground. The discharge path of the condenser 36 is through coil 32, resistor 33 and winding 35 to ground since diode 31 prevents the positively charged condenser from discharging through winding 34. The magnetomotive force established on magnetic core 27 by the discharge current through winding 35 is sufficiently great to change the state of magnetization of the core 27 from that state indicated at point E in Figure 3 to that state at point C which, upon termination of this magnetomotive force, leaves the core 27 in the state of magnetization indicated at point A. Thus, it is seen that as the magnetic core 26 changes from the one state of remanence to the zero state of remanence, the transfer circuit 30*a* establishes the one state of remanence in the core 27. If the core 26 is in the zero state of remanence indicated by point E in Figure 3 when a positive shift pulse is applied to shift winding 37, a very small negative voltage is induced in output winding 34 which is prevented by diode 31 from charging condenser 36 negatively with respect to ground and thereby setting up a negative magnetomotive force on magnetic core 27 by the discharge current. Thus, transfer circuit 30*a* inhibits the establishment of a magnetomotive force on magnetic core 27 if magnetic core 26 is in the zero state of remanence when a shift pulse is applied to winding 37. Briefly summarized, the application of a shift pulse to a magnetic core shift register causes all cores to assume the binary zero state of remanence. If a core was previously in the one state of remanence, an input pulse is supplied through the transfer circuit to the input winding of the succeeding core which establishes a positive magnetomotive force on that core to set it in the one state of remanence. If a core was previously in the zero state of remanence, no input pulse is received by the input winding of the succeeding core, and the succeeding core, previously changed to the zero state of remanence by the shift pulse, remains in the zero state of remanence.

In order to illustrate the writing operation, assume that it is desired to write the binary number 1001 in register 1 of Figure 1. All cores in register 1 are presumed in the zero state prior to writing. Lines 14, 17 and 18 simultaneously receive current pulses which establish a magnetomotive force on cores 26 and 29 sufficient in magnitude to change their state of remanence from that state indicated at point E on the curve in Figure 3 to that state at point C, and upon termination of the pulses, the state of magnetization settles at point A. The magnetomotive force applied to cores 27 and 28 by virtue of the current pulse on line 18 is insufficient, in the absence of pulses on lines 15 and 16, to drive these cores from the state of remanence indicated at point E on the curve in Figure 3 to that state indicated at point C, and upon termination of the pulse on line 18, the state of magnetization of these cores reverts to point E. Consequently, cores 27 and 28 remain in the state of remanence indicative of a binary zero; whereas cores 14 and 17 are changed to the state of remanence indicative of a binary one. The binary number 1001, written in register 1 by pulsing the X drive lines 14 and 17 simultaneously with the Y drive line 18, may be written in any one of registers 2 through 4 by pulsing its respective Y drive line simultaneously as the X drive lines 14, 17 are pulsed.

If it is desired to shift the binary number 1001 from register 1 to channel 1, four shift pulses are applied to the shift drive line 22 since register 1 is four cores long. The shift windings 37 through 40 are so wound on cores 26 through 29, respectively, that a positive shift pulse applied to shift line 22 establishes a negative magnetomotive force on cores 26 through 29 sufficient in magnitude to change the state of magnetization of all cores at the state indicated at point A on the curve in Figure 3 to that state at point E. Therefore, cores 26 and 29, upon receipt of the first shift pulse, undergo a change in state of magnetization from the state indicated at point A on the curve in Figure 3 to the state at point D and cores 27 and 28 undergo a change in magnetization from the state indicated at point E to the state at point D, all cores returning to the state of magnetization indicated at point E upon termination of the shift pulses. As core 26 changes its state of magnetization, an induced voltage in winding 34 that is positive with respect to ground produces a current which passes through diode 31 to charge condenser 36 positively with respect to ground. The condenser 36 commences to discharge through the coil 32, resistor 33 and winding 35 as it is being charged by the current from winding 34, the charging rate initially exceeding the discharge rate. The condenser 36 is charged sufficiently upon termination of the shift pulse that a discharge current through winding 35 is large enough to change the state of magnetization of core 27 from that state at point E on the curve in Figure 3 to that state at point A. The first shift pulse applied to shift winding 40 changes the state of magnetization of core 29 from the one state to the zero state and establishes a pulse on the output winding 41 which is applied to channel 1. Magnetic cores 26, 28 and 29 are in the zero state of remanence after the first shift pulse. Upon termination of the second shift pulse, the binary one in core 27 is transferred to core 28, the other cores remaining in the zero state of remanence. The third shift pulse transfers the binary one from core 28 to core 29, and the fourth pulse transfers the binary one in the form of a pulse on winding 41 to channel 1. The shifting operation is completed after the fourth shift pulse and all cores in register 1 are in the zero state of remanence.

The arrangement of magnetic core shift registers in an array as in Figure 1 provides a system for simultaneously writing and shifting. More specifically, writing may take place in any one magnetic core shift register while shifting may occur simultaneously in any one or all of the remaining magnetic core shift registers. By virtue of this simultaneity of operation, a large quantity of data is more expeditiously handled.

Figure 4:
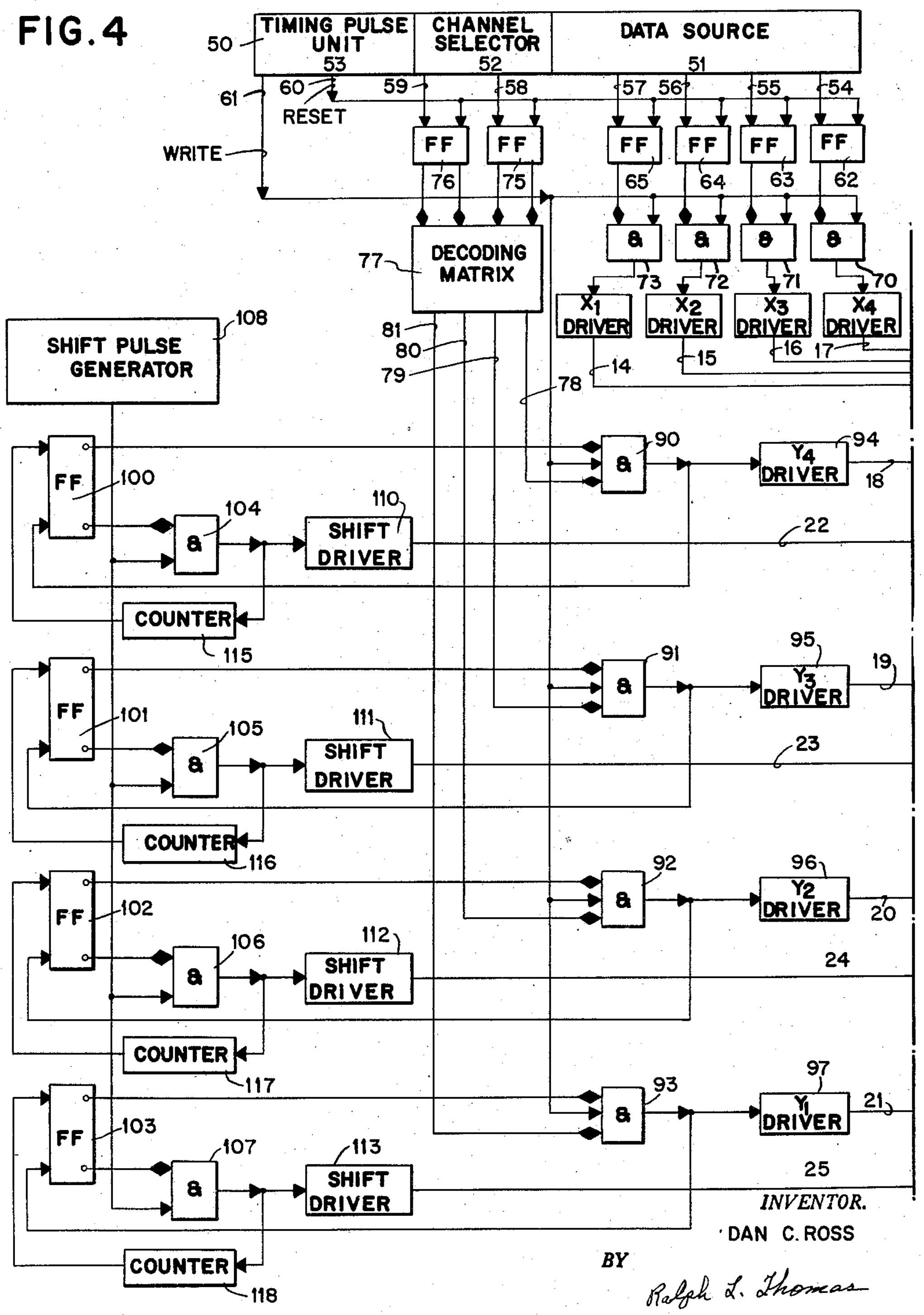
Fig. 4 is a block schematic of a circuit employed to control writing and shifting in the array of Figure 1.

Reference is made to Fig. 4 for a discussion of the control circuit employed for writing and shifting in the magnetic core array of Figure 1. A conventional input device 50 including a data source 51, a channel selector 52 and a timing pulse unit 53 is one of several well-known varieties of input devices such as, for example, a magnetic drum system, a magnetic tape or a card reading system wherein pulses are supplied to lines 54 through 61. A message in the form of binary numbers is represented by pulses supplied on lines 54 through 57 to flip-flops 62 through 65, respectively, which constitute a register. A binary one is represented by a positive pulse, a binary zero by the absence of a pulse. Positive pulses applied on lines 54 through 57 cause the respective flip-flops 62 through 65 to establish positive D.C. levels on associated output lines to And circuits 70 through 73 respectively. When timing pulse unit 53 supplies a pulse on line 61 to And circuits 70 through 73, an output pulse, co-extensive in time with the input pulse, is established on associated output lines to drivers X4 through X1, respectively. The X1 through X4 drivers in turn establish pulses on X drive lines 14 through 17, respectively, which write the message in the magnetic core array of Figure 1.

Channel selector 52 applies pulses to both lines 58 and 59, either line 58 or 59, or neither line 58 or 59. Depending on the combination of pulses received, flip-flops 75 and 76 in turn deliver various combinations of D.C. levels to decoding matrix 77. For each combination of D.C. levels applied to decoding matrix 77, a different one of the output lines 78 through 81 is rendered positive, all other output lines being rendered negative. The D.C. levels on lines 78 through 81 are applied to And circuits 90 through 93, respectively, but since one of these lines is positive, its respective And circuits pass a positive pulse to a respective one of the Y-drivers 94 through 97 which in turn pulses a Y drive line to Figure 1. Thus, the channel selector 52 serves to select which register is written in and consequently which channel receives the word when shifting takes place.

The timing pulse unit 53 supplies a reset pulse on line 60 prior to each word from the data source which serves to reset the flip-flops 62 through 65, 75 and 76 to the zero state of conduction. If pulsed by the data source 51, the flip-flops 62 through 65 are set in the one state of conduction; otherwise, they remain in the zero state of conduction. The flip-flops 75 and 76 are pulsed in a similar manner to energize the decoding matrix 77. The timing pulse unit 53 supplies a write pulse on line 61 when it is desired to write a word message in one of the magnetic core shift registers of Figure 1. The pulse on line 61 is applied to And circuits 70 through 73 for permitting data pulses to energize the X drivers associated with lines 14 through 17, respectively, and to And circuits 90 through 93 permitting the energization of one of the Y drivers which selects the register written in.

All flip-flops and And circuits employed in Figure 4 are of the type illustrated and described in co-pending application, Serial No. 414,459 filed on March 5, 1954, by B. L. Saraham et al. The decoding matrix 77 is one of any conventional variety as, for example, one of the type shown in an article entitled "Rectifier Networks for Multi-position Switching, Proceedings of the I.R.E.," published in February 1949, on pages 139 through 147. A detailed description of the driver circuits is given subseqently.

In order to illustrate the operation of the control circuits for writing, assume again that it is desired to write the binary number 1001 in register 1 of Figure 1. The timing pulse unit 53 supplies a pulse on reset line 60 which sets flip-flops 62 through 65, 75 and 76 in the zero state of conduction. Lines 54 and 57 then are pulsed by data source 51 which sets the flip-flops 62 and 65 in the one state of conduction, flip-flops 63 and 64 remaining in the zero state of conduction. Channel selector 52 energizes lines 58 and 59 in a manner to set flip-flops 75 and 76 so that decoding matrix 77 renders output line 78 positive. The flip-flops 62 and 65, each being in the one state of conduction, condition the And circuits 70 and 73 with positive D.C. levels; whereas the And circuits 71 and 72 are conditioned with negative D.C. levels since flip-flops 63 and 64 did not receive positive input pulses on lines 55 and 56. The timing pulse unit 53 now supplies a write pulse on write line 61 which is passed by And circuits 70 and 73 to the X4 driver and X1 driver, respectively, and they in turn establish write pulses on output lines 14 and 17 to Figure 1. The write pulse on line 61 is passed by And circuit 90 which has been previously conditioned by a positive D.C. level on line 78 (the additional D.C. level input to And circuit 90 is assumed positive at this point) to the Y4 driver which delivers a pulse on line 18 threading all cores in register 1. Hence the binary number 1001 is written in register 1 of Figure 1 as previously explained. Timing pulse unit 53 again pulses reset line 65 and the writing operation commences again.

Reference is made to the lower left quadrant of Figure 4 for a discussion of the shift control circuits. Status flip-flops 100 through 103 supply a positive D.C. level on their upper output terminals to And circuits 90 through 93, respectively, when corresponding registers 1 through 4 are empty. A word can be written in a register only if its status flip-flop establishes a positive D.C. level on the And circuit supplying its Y driver. The write pulse passed by one of the And circuits 90 through 93 to a respective Y driver when a word is written is applied to the lower input terminal of the respective flip-flop, thus setting the status flip-flop in the opposite state of conduction.

Shifting is accomplished when flip-flops 100 through 103 have a positive D.C. level established on their lower output terminals to And circuits 104 through 107, respectively. Shift pulse generator 108 supplies positive pulses to the And circuits 104 through 107 which, when conditioned by the status control flip-flops pass the pulses to shift drivers 110 through 113, respectively. For each pulse received, the shift drivers 110 through 113 supply a shift pulse on lines 22 through 25, respectively, to the shift windings of respective registers in Figure 1. Counters 115 through 118 each receive as many shift pulses as there are number of cores in a magnetic core shift register from And circuits 104 through 107, respectively, before delivering an output pulse to the upper input terminals of status flip-flops 100 through 103, respectively. A pulse from any one of the counters 115 through 118 sets its respective status flip-flop in the opposite state of conduction; whereupon writing may take place. These counters may be any one of several conventional varieties well-known to those skilled in the art.

Assuming the binary number 1001 is being written in register 1, the write pulse from And circuit 90 is applied to the lower input terminal of flip-flop 100 simultaneously as it is applied to the Y4 driver. As a consequence, the flip-flop 100 changes its state of conduction from that which supplies a positive D.C. level on the upper output terminal to And circuit 90 to that state which supplies a positive D.C. level on the lower output terminal to And circuit 104. The And circuit 104 now passes the pulses from the free running shift pulse generator 108 to shift driver 110 and counter 115. Once four pulses are passed by the And circuit 104, the magnetic core shift register number 1 is emptied, and a positive pulse is applied to the upper input terminal of flip-flop 100 from the output of counter 115. Whereupon, flip-flop 100 changes to the opposite state of conduction and establishes a positive D.C. level on And circuit 90. Since the And circuit 104 now is deconditioned by a negative D.C. level, no pulses from shift pulse generator 108 are passed, but the And circuit 90 is conditioned to pass a write pulse when selection line 78 is positively energized by decoder matrix 77 and a write pulse is applied to line 61. If another write pulse is received and a further word written in register number 1, the status control flip-flop 100 again reverses its conduction state; whereupon the And circuit 90 is deconditioned by a negative D.C. level from the upper output terminal of flip-flop 100, and the And circuit 104 is conditioned by a positive D.C. level from the lower output terminal of flip-flop 100. The shifting operation commences again in register number 1. The status control flip-flops 101 through 103 and their associated circuits, control magnetic core shift registers 2 through 4 in Figure 1 in a like manner. It is noted that the shifting operation automatically takes place immediately after a word is written and that the And circuits 90 through 93 are conditioned upon completion of shifting to permit writing in the respective registers. It is further noted that shifting from a register is inhibited when writing takes place in that register and vice versa. Although writing may occur in only one register at a given instant, shifting may occur simultaneously at the same instant in any or all the remaining registers.

Reference is made to Fig. 5 for a description of a driver circuit that may be employed as an X driver, Y driver, or shift driver. A tetrode-connected pentode 120 has its suppressor grid 121 connected to anode 122 by resistor 123. A positive source of potential is connected through resistor 124 and coil 125 to anode 122. Control grid 126 is connected to a source of plus 10 or minus 30 volts by resistor 127. Resistor 128, connected from screen grid 129 to a source of positive 150 volts, and condenser 130, connected between screen grid 129 and ground, serve as a decoupling circuit. Cathode 131 is grounded. The resistors 123, 124 and 127 serve as current limiting resistors. Vacuum tube 120, normally rendered non-conductive by the —30 volts source, conducts when writing or shifting takes place. A positive 10 volt pulse applied to the control grid 126 produces a current pulse in the shift lines or write lines of Figure 1 in the direction indicated by the arrows on these lines. It is pointed out that winding 125 represents the write windings or shift windings in Fig. 1 and that resistor 124 is shown in the lower right hand corner of Figure 1 connected to a positive 250 volt source. When the circuit in Fig. 5 is used as a shift driver, the number of turns in winding 125 is much greater than when used as an X or Y driver. In either case, the circuit of Figure 5 serves as an infinite-impedance source of constant-current pulses.

The constant-current characteristic of the circuit in Fig. 5 is essential to prevent undesired current fluctuations by voltages established on the writing circuits and the shifting circuits as a result of their juxtaposition on magnetic cores undergoing a change in magnetization. The effect of currents created by induced voltages may tend to inhibit an intended operation or tend to execute an unintended operation.

In order to illustrate the effect tending to inhibit an intended operation, assume that a one is being written in core 28 in Figure 1, that core 140 is in the zero state, and that cores 141 and 142 are undergoing a change from the zero state to the one state of magnetization by the transferal of ones from cores 143 and 144 such that a current is established on drive line 16 in the direction opposite to the arrowhead. If these events exist simultaneously, write currents in lines 16 and 18, in the direction indicated by arrowheads, establish a magnetomotive force on core 28 in the counterclockwise direction tending to write a one, and an interfering voltage induced in write line 16 by the shifting operation taking place in cores 141 and 142 tends to establish a current in write line 16 in the direction opposite to the arrowheads which opposes the write current tending to write a one in core 28. The possibility here exists that the net current in write line 16 is not sufficient to produce the necessary magnetomotive force, in combination with the magnetomotive force produced by the write current in line 18, to change the magnetization of magnetic core 28 to the one state indicated at point A in Figure 3. Under the same conditions, assume that cores 141 and 142 are undergoing a change in their magnetic state by the shifting operation such that a current is established in write line 16 in the direction of the arrowhead. The net current in write line 16 is now equal to the combined result of the write current established by the X3 driver (Fig. 4) and the induced current from the shifting operation in cores 141 and 142, resulting in a magnetomotive force being applied to core 28 that is greater than required to effect a change to the one state of magnetization. The possibility exists now that the magnetomotive force applied to core 140 by the current in line 16 is sufficiently great to change the magnetization of core 140 from the zero state to the one state. Hence, the possibility of performing an unintended operation is presented.

The possibility of performing an unintended operation is eliminated by employing an infinite-impedance constant-current generator of the type shown in Fig. 5 for the X drivers, the Y drivers and shift drivers. Any voltages induced in the shift lines by the write line currents or any voltages induced in the write lines by the shift line currents are impressed on such a high impedance that negligible additional currents result, and consequently, the operation of either the writing circuits or the shifting circuits is not interfered with by the operation of the other.

In the field of business accounting machines where large quantities of data are processed, speed is of primary importance. Optimum speed is obtained in the present system when incoming data, in the form of binary numbers from data source 51, arrive with preassigned addresses that vary sequentially. That is to say, the first four words to arrive are written in registers 1 through 4, respectively, and since the registers are emptied by the shifting operation immediately after writing takes place, the next four words to arrive are also written in registers 1 through 4, respectively. Hence the magnetic core array of Figure 1 must include a sufficient number of registers so that by the time sequential writing has progressed to the last register, the first register is empty. In other words, the number of magnetic core shift registers is determined by the rate at which information is supplied by data source 51 and the rate of shifting.

The apparatus herein disclosed has still further utility as an electronic sorting device. When so employed, the system receives information words from data source 51 that arrive with preassigned random addresses. For example, information words may arrive designated for channels 2, 5, 3 and 1 which, upon completion of the writing operation of each information word, are successively shifted in the order listed. Assuming that two successive words are addressed to register 1, the second word is not accepted until the first word is written and shifted. Operation of this type may be obtained with an information source consisting of a magnetic drum. Each word and associated channel address stored on the drum continually reappear at terminals 54 through 59 of Fig. 2 until the word is actually written in the core array. The word and associated address may be erased from the drum under control of a pulse at the output of any of the And circuits 90 through 93.

Although four registers composed of four cores each are illustrated and described, it is to be understood that the number of registers and the number of cores in each register can be varied as desired to meet the demands of a particular system.

While there are shown and described and pointed out the fundamental features of the invention as applied to a particular embodiment, it is understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A system for storing information comprising, a plurality of magnetic core registers that include bistable core elements, writing means coupled to said magnetic core registers for selectively writing information in any one of said magnetic core registers, shift means coupled to said magnetic core registers for shifting stored information from said magnetic core registers, and a control circuit coupled to said writing means and said shifting means for preventing simultaneous writing and shifting in the same magnetic core register.

2. A system for storing and transferring information comprising, a plurality of magnetic core registers, each register having a plurality of stages, each stage including a bistable magnetic core, means coupled to said magnetic core registers for causing said cores in a selected one of said magnetic core registers to assume a predetermined state of magnetization representative of data, shift means coupled to said magnetic core registers for shifting stored data therefrom, control means coupled to said first means and said shifting means to prevent simultaneous storing and shifting in the same magnetic core register whereby data may be stored in a selected register and other data may be transferred simultaneously from the remaining registers.

3. A system for simultaneously storing and transferring information comprising, a plurality of magnetic core registers arranged in an array and including bistable core elements, writing means coupled to said magnetic core registers for writing information in any one of said magnetic core registers, shift means coupled to said magnetic core registers for shifting stored information therefrom, control means coupled to said writing means and said shifting means to prevent simultaneous storing and shifting in the same magnetic core register whereby information may be stored in a selected register and other information may be transferred simultaneously from the remaining registers.

4. A system for simultaneously storing and transferring information comprising, a plurality of magnetic core registers arranged in an array and including bistable core elements, coincident-current writing means coupled to each of said magnetic core registers for writing information in any one of said magnetic core registers, shift means coupled to said magnetic core registers for shifting stored information therefrom, control means coupled to said coincident-current writing means and said shifting means to prevent simultaneous storing and shifting in the same magnetic core register whereby information may be stored in a selected register and other information may be transferred simultaneously from the remaining registers.

5. In a system for simultaneously reading and writing information comprising in combination, a group of registers arranged in an array, each of said registers being composed of a plurality of magnetic bistable cores, coincident-current writing means coupled to each of said registers for writing information in an individual one of said registers, shift means coupled to said group of registers for reading information therefrom, said shift means including a coupling circuit with a delay means connected between each core and a succeeding core in each of said registers with the last core in each of said registers being coupled to a load device, control circuit means coupled to said coincident-current writing means and said shifting means whereby simultaneous reading and writing is permitted in said group of registers arranged in an array but reading and writing in the same register is inhibited.

6. A device for simultaneously reading and writing in a magnetic core shift register array comprising, a plurality of magnetic core shift registers arranged in an array, each shift register having a plurality of bistable magnetic cores, each core being provided with a shift winding coupled thereto, a first high impedance generator means for supplying constant-current shift pulses to said shift windings, a plurality of transfer circuits for each magnetic core shift register equal in number to one less than the number of magnetic cores in each magnetic core shift register, each of said transfer circuits including a signal delay means and a serially connected unilateral conducting device, coupling means coupling one transfer circuit from each magnetic core to the adjacent succeeding magnetic core except the last magnetic core in each magnetic core shift register, said last magnetic core in each magnetic core shift register being coupled to a load device, a first group of conductors arranged according to one coordinate of said magnetic core register array with individual ones of said conductors threading all corresponding cores of each of said magnetic core shift registers, a second high impedance generator means for supplying constant-current pulses to selected conductors in said first group of conductors, a second group of conductors arranged according to another coordinate of said magnetic core register array with individual ones of said conductors threading all cores in a given magnetic core shift register, a third high impedance generator means for selectively supplying a constant-current pulse to a designated conductor in said second group of conductors, control circuit means coupled to said third high impedance generator means and said first high impedance generator means for inhibiting writing and shifting in the same magnetic core shift register, said control circuit means comprising a bi-stable device for each magnetic core shift register which permits writing when set in one condition of stability and permits shifting when set in the other condition of stability, said control circuit means including further means which sets the bi-stable device in said one condition of stability upon completion of shifting.

7. A device for simultaneously reading and writing in a magnetic core shift register array comprising, a plurality of magnetic core shift registers arranged in an array, each shift register having a plurality of bistable magnetic cores, a shift winding for each of said magnetic cores, a first high impedance generator means for supplying constant-current shift pulses to designated ones of said magnetic core shift registers, a plurality of transfer circuits for each magnetic core shift register equal in number to one less than the number of magnetic cores in each magnetic core shift register, each of said transfer circuits including a signal delay means and a serially connected unilateral conducting device, coupling means coupling one transfer circuit from each magnetic core to the adjacent succeeding magnetic core in each magnetic core shift register except the last magnetic core in each magnetic core shift register, said last magnetic core in each magnetic core shift register being coupled to a load device through a unilateral conducting device, a first group of conductors arranged according to one coordinate of said magnetic core register array with individual ones of said conductors threading all corresponding cores of each of said magnetic core shift registers, a second high impedance generator means for supplying constant-current pulses to selective ones of said first group of conductors, a second group of conductors arranged according to another coordinate of said magnetic core registers array with individual ones of said conductors threading all cores in a given magnetic core shift register, a high impedance constant-current generator means for each conductor of said second group of conductors, control circuit means coupled to said last named high impedance constant-current generator means and said first high impedance generator means for permitting writing in a selected one of said plurality of magnetic core shift registers arranged in an array and simultaneously permitting shifting from the remaining magnetic core shift registers arranged in an array.

8. A system for storing information comprising, a group of magnetic core registers which include bistable core elements, writing means coupled to said group of registers for writing information in any of said registers, read-out means coupled to said registers for reading information therefrom, and a control circuit coupled to said writing means and said read-out means which permits said writing means and said read-out means to perform simultaneously on different registers in said group of registers.

9. A system for storing information comprising, a group of magnetic core registers which include bistable core elements, writing means coupled to said registers for selectively storing information in at least one of said registers, means coupled to said group of registers for deriving stored information therefrom, a control circuit means coupled to said writing means and said means for deriving information from said group of registers, said control circuit means being operable to permit simultaneous reading and writing in said group of registers while inhibiting reading and writing in the same register.

References Cited in the file of this patent

UNITED STATES PATENTS 2,666,151 Rajchman -------------- Jan. 12, 1954

OTHER REFERENCES

Publication I, Electronics, January 1951 pp. 108–111.

Publication II, Electronics, April 1953 pp. 146–149.

Publication III, Proc. Assoc. Comp. Mach., May 2, 1952, pp. 207–12.